May 14, 1963  H. P. HARLE  3,089,312
SEMI-AUTOMATIC ICE MAKER FOR HOUSEHOLD REFRIGERATORS
Original Filed Nov. 7, 1960  2 Sheets-Sheet 2
FIG. 2
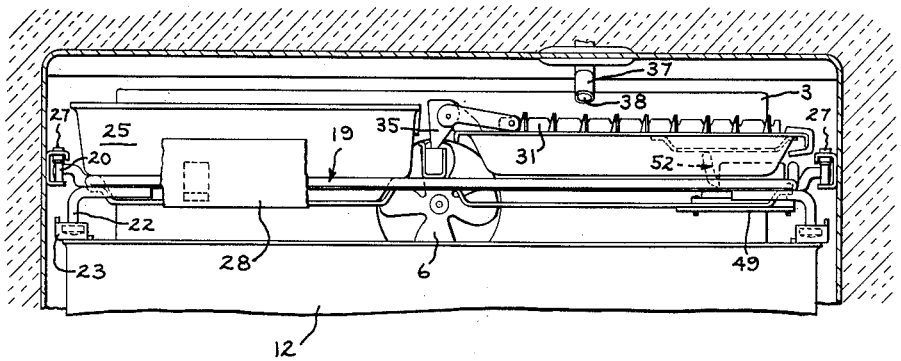
FIG. 3
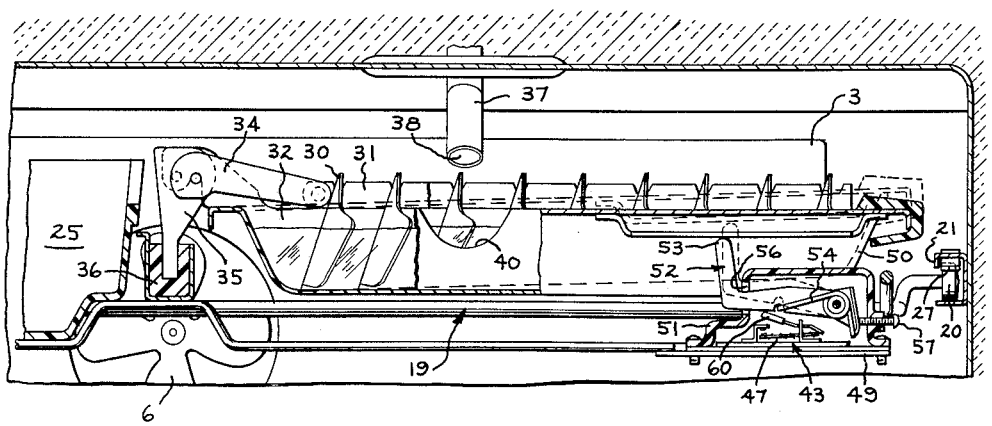
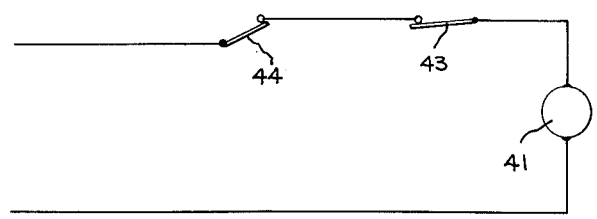
FIG. 4
*INVENTOR.*
HAROLD P. HARLE
BY
HIS ATTORNEY

United States Patent Office 3,089,312
Patented May 14, 1963

3,089,312
SEMI-AUTOMATIC ICE MAKER FOR HOUSEHOLD REFRIGERATORS
Harold P. Harle, Louisville, Ky., assignor to General Electric Company, a corporation of New York
Continuation of application Ser. No. 67,727, Nov. 7, 1960. This application Nov. 8, 1961, Ser. No. 155,879
8 Claims. (Cl. 62—135)

The present invention relates to household refrigerators and is more particularly concerned with a semi-automatic arrangement for producing and storing ice pieces in a refrigerator.

This application is a continuation of my prior application Serial No. 67,727 filed November 7, 1960, now abandoned, and assigned to the same assignee as the present invention.

In recent years various devices have been proposed or used for the automatic making, harvesting and storing of ice pieces in domestic refrigerators. Such devices have included relatively expensive control circuitry and operating means for initiating and sequentially operating the devices through ice making, ice harvesting and water filling steps. The resultant high cost thereof has limited their incorporation in any but the higher priced lines of refrigerators as a substitute for the usual freezing trays which are manually filled with water and from which the ice pieces are manually discharged.

The present invention has as its primary object the provision of an improved semi-automatic ice making arrangement for household refrigerators which provides most of the advantages of a completely automatic ice maker at a much lower cost.

Another object of the invention is to provide in a household refrigerator, means for making and harvesting ice pieces without completely removing the freezing trays from the refrigerator either for filling or harvesting purposes.

A more specific object of the present invention is to provide an improved means for automatically refilling a freezing tray with a charge of water without removing the tray from the refrigerator cabinet.

Further objects and advantages of the invention will become apparent as the following description proceeds and the features of novelty which characterize the invention will be pointed out with particularity in the claims annexed to and forming a part of this specification.

In carrying out the objects of the present invention, there is provided, within the freezer compartment of a household refrigerator, a sliding shelf assembly for supporting a freezing tray and preferably also a storage receptacle so positioned and arranged on the sliding shelf assembly that the ice pieces can be discharged from the freezing tray into the receptacle without removing either the tray or the receptacle from the shelf. To this end, the freezing tray is pivotally supported on the shelf along one edge thereof so that it can be moved about its pivot support from a normal upright freezing position to an inverted ice-discharging position. For the purpose of automatically introducing the required amount of water into the tray whenever it is empty, and in its freezing position, there is provided a water supply line having its outlet end disposed above the tray in its normal position within the compartment and a solenoid actuated valve. For the purpose of controlling the operation of the valve, there is provided an electrical control circuit including a first switch operated by a movable member engaged by and supporting the other or free end of the tray in such a manner that whenever the tray is empty and in its normal position within the freezer compartment, the solenoid valve will be energized to introduce water into the tray and thereafter will be de-energized when the weight of that water trips the tray operated switch to an open circuit position. Also, in series connection with the solenoid valve and the tray-operated switch, there is provided a second switch operated by the shelf sliding assembly and arranged to open the solenoid valve circuit to prevent energization of the valve whenever the assembly is moved forwardly to a position in which the tray is no longer in normal filling position relative to the water supply line.

For a better understanding of the invention reference may be had to the accompanying drawings in which:

FIGURE 2 is a front view taken generally along line 2—2 of FIGURE 1;

FIGURE 3 is an enlarged fragmentary view similar to FIGURE 2; and

Figure 1:
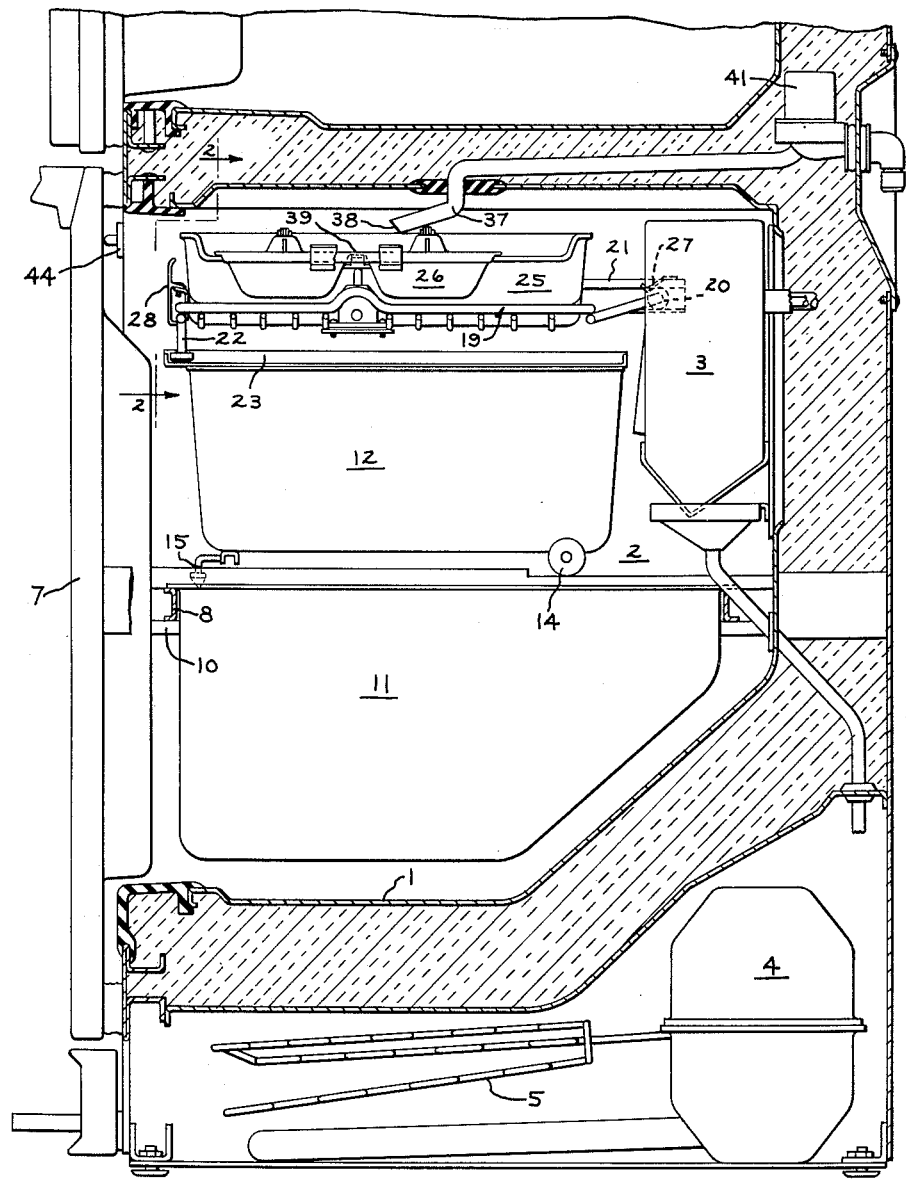
FIGURE 1 is a side elevational view, partly in section, of a refrigerator cabinet including the semi-automatic ice maker of the present invention.

FIGURE 4 diagrammatically illustrates the control circuit employed for the semi-automatic operation of the ice maker of the present invention.

Referring to FIGURE 1 of the drawing, there is shown a refrigerator cabinet including a liner 1 forming a freezer compartment 2 for the storage of frozen foods. The contents of this compartment are maintained at below freezing temperatures by means of an evaporator contained in a housing 3 supported on the rear wall of the compartment 2, the evaporator forming part of a refrigerating system including a motor compressor unit 4 and a condenser 5. A fan 6 circulates air from the compartment 2 over the evaporator.

As the compartment 2 is at the lower part of the refrigerator cabinet, a convenient means for the storage of foodstuffs and the like in that compartment comprises a sliding drawer assembly including a drawer front 7 for closing the access opening to the storage compartment 2. The drawer front 7 is part of a drawer assembly that includes a pair of spaced slides connected together by front and rear cross members 8 to form an open cradle or frame. The drawer front 7 is suitably secured to the forward end portions of the drawer slides and the entire drawer structure is slidably supported within the compartment 2 by the drawer supports 10 secured to the outside walls of the compartment 2. A lower storage pan 11 is supported within the cradle or framework including the cross members 8 while a second or upper storage pan 12 is supported by the same framework in such a manner that while it normally moves forward with the framework when the drawer is opened, it can be moved rearwardly when the drawer is open to provide access for the lower pan 11. Specifically, the upper pan 12 is provided with a pair of rollers 14 which normally ride on the upper surface of the supports 10 and the forward end of this pan is supported on the drawer framework by means of a pair of legs 15 which detachably anchor the upper pan 12 to the drawer structure whereby the upper pan 12 moves out of the compartment when the drawer is opened. The particular drawer structure thus far described is more fully described in Patent 2,843,441, Jewell, issued July 15, 1958 and assigned to the same assignee as the present invention and reference is made to that patent for a more complete description of the drawer and its mode of operation.

For the manufacture and storage of ice pieces, there is provided above the upper pan 12 a sliding assembly which comprises a wire shelf 19 supported at its rear corners by means of rollers 20 which ride on slides 21 secured to the side walls of the compartment 2 while the forward edge of the shelf is provided with a pair of legs 22 adapted to engage and ride on the side edges 23 of the pan 12. While the shelf 19 is designed to be supported by the upper rim 23 of the pan 12 and slidably supported on the guides 21, it is preferably arranged so that it will remain within the storage compartment during normal opening of the drawer but can be moved to an open position for access to the contents thereof. For this purpose there is provided a spring latching means 27 mounted on one or both of the guides 21 in such a position as to engage the adjacent roller 20 when the shelf 19 is in its recessed position and latch the shelf in that position. To facilitate moving the shelf forwardly to an accessible position, a suitable handle 28 is provided at the front of the shelf 19.

In the illustrated embodiment the shelf 19 is so designed that the left side thereof, as viewed in FIGURE 2 of the drawing, is in the form of an open frame shaped to receive and position an ice receptacle 25 which extends about half the width of the shelf 19 and approximately the full depth thereof. The other or right hand side of the shelf is designed to support one or more freezing trays 26 in which water is frozen into ice pieces and from which ice pieces are harvested by tilting the trays about one end thereof to an inverted position over the receptacle 25 whereby the ice pieces can be harvested directly into the receptacle.

The trays 26 can be of any construction such that the ice pieces can be readily released therefrom during the harvesting operation. In the illustrated embodiment of the invention, each tray is composed of metal and is of the well-known type which include means for providing a relative movement between the ice blocks and the adjacent tray surfaces in order to break the bond between the ice pieces and the adjacent surfaces so that the ice pieces will drop from the tray as it is moved from a normal or horizontal freezing position to the inverted position above the receptacle 25. More specifically the illustrated tray comprises a rectangular pan which is divided into a plurality of ice pockets by means of a movable wall grid that is preferably locked in the tray against detachment therefrom in such a manner that the grid and tray form a unitary structure. The grid structure includes a plurality of transverse dividers 30 and a longitudinal divider interlocked therewith and comprising an upper section 31 and a lower section 32 as shown in FIGURE 3 of the drawing. The sections 31 and 32 are connected by means of a linkage generally indicated by the numeral 34 and this mechanism 34 is removably supported on the shelf by a vertical handle member 35 which is supported in a slotted support 36 on the shelf 19. Pivoting movement of the tray to its inverted position causes a relative movement between the handle 35 and the tray whereby the longitudinal divider sections move relatively to one another to cause a tilting of the transverse dividers and a release of the ice blocks. For a more detailed description of a tray and receptacle arrangement of this type, reference may be had to Patent 2,955,441 issued October 1, 1960 in the names of John A. Dahlgren and George W. Andriot and assigned to the same assignee as the present invention. Such an arrangement of the freezing tray or trays and storage receptacle on a one or two piece sliding shelf assembly has as a principal advantage the fact that the ice pieces can be harvested from the freezing trays without removing the trays or the receptacle from the shelf. It is necessary only to move the assembly forwardly out of the compartment to a position in which the trays can be conveniently tilted by hand to an ice discharge position above the receptacle.

The present invention is broadly an improvement on such an ice service in providing automatic refilling of the trays with water following the harvesting step. To this end means are provided within the freezer compartment 2 for introducing a fresh charge of water into the empty freezing trays whenever the empty trays are returned to their normal positions within the compartment 2. In the illustrated embodiment of the invention this water supply means comprises a water supply line 37 having its outlet end 38 positioned within the compartment at a point above the trays 26 in their normal position. As two trays are employed in the illustrated embodiment of the invention, these trays preferably are integrally connected along their adjacent longitudinal edges 39 while a slot 40 provided in the interconnecting or common wall structure is provided for the flow of water from one tray to another as it is introduced from the supply line 37. It will be obvious, of course, that only one tray need be employed and that the tray or trays may be of various types so long as the ice pieces can be readily removed therefrom when they are moved to an inverted position above the receptacle 25.

A solenoid valve 41 in the supply line 37 connects the supply line 37 to a source of water, as for example to the house water supply, in such a manner that when the valve 41 is opened water flows through the supply line 37 and into the freezing trays. By automatically controlling this water supply means, there is provided in a household refrigerator an ice service requiring as the only manual operating step the periodic harvesting of the ice pieces into the storage receptacle.

The water valve control circuitry provided for this semi-automatic operation comprises, in series connection, a first switch 43 operable by the weight of the freezing tray and its contents to control the introduction of a predetermined quantity of water into the tray structure and a second switch 44 adapted to interrupt the valve circuit whenever the shelf 19 is or might be in an extended position in which the tray or trays 26 are not positioned below the water outlet 38. In the illustrated embodiment of the invention, the switch 44 is mounted on the face of the cabinet so that it is actuated by the drawer front 7. When the drawer is open, or in other words in a position in which the trays may not be in their normal position, switch 44 will open to break the valve circuit.

As is shown in greater detail in FIGURE 3 of the drawing, the switch 43 is of the over center or toggle type and is spring biased by means of a spring 47 to a normally closed position. This switch is mounted on a base 49 secured to the shelf 19 adjacent and below the free end 50 of the tray assembly 26. The base 49 comprises part of a housing 51 which encloses the switch 43 and protects it from any water which might be spilled accidentally over the edges of the trays 26. An arm 52, having one end pivotally supported within the housing 51 and its other end 53 extending out through the opening 56 in housing and then upwardly for supporting engagement with the tray structure 26, is spring biased in an upward direction by means of a spring 54, its movement in this direction being limited by the upper edge of the opening 56. An adjusting screw 57 also carried by the housing 51 is provided for adjusting the biasing action of the spring 54 so that when the tray structure is empty, the arm 53 under the weight of the empty tray structure will remain in its elevated or dotted line position. In this position the arm 52, which is also in contact with a switch actuating arm 60, permits the arm 60 to rise under the action of the spring 47 and close switch 43 thereby completing the circuit to the solenoid valve 41 when the switch 44 is also closed.

As water enters the tray structure 26 from the feed line 37, it distributes itself throughout the tray or trays. The screw 57 is so adjusted that when the tray is filled to the desired level with water, the added weight of the water will overcome the biasing action of spring 54 and spring 47 to cause the arm 52 to move to its full line position as shown in FIGURE 3, thus causing switch 43 to open and thereby close valve 41.

By the switch and actuating arm structure, it will be seen that the arm 52 is held in its elevated or dotted line position by both the spring 54 and by the over center spring 47. As the water is introduced into the tray structure, the pressure on the arm 52 gradually increases and it gradually moves to its lower, full line position against the joint biasing action of the spring 54 and the spring 47. Near the end of its travel in this direction the switch 43 moves to its closed position in which the biasing action of the spring 47 is lessened. This over-center action of the switch eliminates any bouncing or hunting that might result in an alternate making and breaking of the switch 43 which could be the case if only a biasing spring such as the spring 54 were employed to operate this mechanism.

A particular advantage of employing a weight operated switch mechanism for controlling the amount of water flowing into the tray structure 26 results from the fact that even if one or more ice pieces might be trapped in the tray structure 26 following a harvesting operation, the weight of these ice pieces will be added to the weight of the tray as it is being filled with water so that the amount of water added will automatically be decreased in proportion to the weight of ice pieces left in the tray. In other words since the switch 43 is operated and opened by the increasing weight of the tray structure during the filling operation, the solenoid valve 41 will be closed at a predetermined total weight regardless of whether that weight is due to the weight of the water or partly due to ice pieces remaining in the tray.

While the invention has been described with particular reference to a sturdy drawer structure arranged to support the shelf 19 in its extended position, it is not limited thereto.

For example, the sliding shelf assembly supporting the tray structures 26 may be operable independently of the remaining portions of the drawer structure shown and may be completely supported on the guides 21 in which case the switch 44 or the shelf 19 or both are designed and positioned so that switch 44 is operated by the shelf 19 and actuated to a circuit open position whenever the shelf 19 is in an extended position. It is therefore intended by the appended claims to cover all such modifications that are within the spirit and scope of the invention.

What I claim as new and desire to secure by Letters Patent of the United States is:

1. A refrigerator including a freezer compartment having an access opening at the front thereof, a sliding assembly including a shelf within said compartment and movable between a recessed position within said compartment and an extended position, a freezing tray, means for pivotally supporting one end of said tray on said shelf for manual movement of said tray about an axis adjacent said one end between a freezing position and an inverted discharge position when said shelf is in the extended position, a movable member carried by said shelf for supporting the other end of said tray when said tray is in its freezing position, said movable member being movable from a first position when said tray is empty to a second position when said tray is filled with water, a water supply line having its outlet end above said tray when said tray is in its freezing position within said compartment, an electrically operated valve in said line for controlling the flow of water to said tray, and an electrical valve-control circuit for operating said valve comprising, in series connection, a first normally closed switch operated by said movable member and movable thereby to an open position when said tray is filled and a second switch operated by said assembly for opening said circuit when said shelf moves to its extended position.

2. A refrigerator including a freezer compartment having an access opening at the front thereof, a drawer slidably arranged in said compartment and including a drawer front for closing said access opening, a sliding shelf within said compartment, said shelf being movable when said drawer is open between a recessed position within said compartment and an extended position, a freezing tray, means for pivotally supporting one end of said tray on said shelf for manual movement of said tray about an axis adjacent said one end between a freezing position and an inverted discharge position, a movable member carried by said shelf for supporting the other end of said tray when said tray is in its freezing position, said movable member being movable from a first position when said tray is empty to a second position when said tray is filled with water, a water supply line having its outlet end above said tray when said tray is in its freezing position within said compartment, an electrically operated valve in said line for controlling the flow of water to said tray, and an electrical valve-control circuit for operating said valve comprising, in series connection, a first normally closed switch operated by said movable member and movable thereby to an open position when said tray is filled and a second switch operated by said drawer for opening said circuit when said drawer is open.

3. A freezer compartment, a sliding assembly movable between a first position within said compartment and a second position, a freezing tray, means for pivotally supporting one end of said tray on said assembly for manual movement thereof about its pivot support between an upright freezing position and an inverted discharge position, means for supporting the other end of said tray in its freezing position for movement of said other end between a first position when said tray is empty and a second position when said tray is filled with water, a water supply means for introducing water into said tray when said tray is in its freezing position and said assembly is in its first position, a valve in said line for controlling the flow of water to said tray and valve control means actuated by said tray and said assembly to open said valve when said tray is empty and in its freezing position and said assembly is in its first position and to close said valve either when said tray is filled with water or when said assembly is moved to its second position.

4. A refrigerator including a freezer compartment, an assembly within said compartment movable between a first position and a second position, a freezing tray, means for pivotally supporting one end of said tray on said assembly for manual movement of said tray about an axis adjacent said one end between a freezing position and an inverted discharge position, a movable member for supporting the other end of said tray on said assembly when said tray is in its freezing position, said movable member permitting movement of said tray from a first position when said tray is empty to a second position when said tray is filled with water, a water supply line for supplying water to said tray when said tray is in its freezing position and said assembly is in its first position, an electrically operated valve in said line for controlling the flow of water to said tray, and an electrical valve-control circuit including switch means operable to open said valve when said tray is empty and said assembly is in its first position and to close said valve when said tray is filled with water or when said shelf is in its second position.

5. A freezer compartment containing an assembly including a shelf within said compartment and movable between a first position and a second position, a freezing tray, means for pivotally supporting one end of said tray on said shelf for movement of said tray about an axis adjacent said one end between an upright freezing position and an inverted discharge position when said shelf is in the second position, a movable member for supporting the other end of said tray when said tray is in its freezing position, said movable member permitting movement of said other end of said tray from a first position when said tray is empty to a second position when said tray is filled with water, a water supply line for supplying water to said tray when said tray is in its freezing position and said shelf is in its first position, an electrically operated valve in said line for controlling the flow of water to said tray, and an electrical valve-control circuit for operating said valve comprising, in series connection, a first normally closed switch operable upon movement of said tray to its second position to open said circuit and a second switch operated by said assembly for opening said circuit when said shelf moves to its second position.

6. A refrigerator including a freezer compartment having an access opening at the front thereof, a drawer slidably arranged in said compartment and including a drawer front for closing said access opening, a sliding shelf within said compartment, said shielf being movable when said drawer is open between a recessed position within said compartment and an extended position, a freezing tray, means for pivotally supporting one end of said tray on said shelf for manual movement of said tray about an axis adjacent said one end between a freezing position and an inverted discharge position, a movable member carried by said shelf for supporting the other end of said tray when said tray is in its freezing position, said movable member permitting movement of said tray from a first position when said tray is empty to a second position when said tray is filled with water, a water supply line having its outlet end above said tray when said tray is in its freezing position within said compartment, an electrically operated valve in said line for controlling the flow of water to said tray, and an electrical valve-control circuit for operating said valve comprising, in series connection, a first normally closed switch movable to an open position when said tray is filled and a second switch operated by said drawer for opening said circuit when said drawer is open.

7. A refrigerator including a freezer compartment, an assembly within said compartment movable between a first position and a second position, a freezing tray, means for pivotally supporting one end of said tray on said assembly for movement of said tray about an axis adjacent said one end between a freezing position and an inverted discharge position, a movable member for supporting the other end of said tray on said assembly when said tray is in its freezing position, said movable member permitting movement of said tray from a first position when said tray is empty to a second position when said tray is filled with water, a water supply line having its outlet end above said tray when said tray is in its freezing position and said assembly is in its first position, an electrically operated normally closed valve in said line for controlling the flow of water to said tray, and an electrical valve-control circuit for operating said valve comprising a first normally closed switch for opening said circuit when said tray moves to its second position and a second switch for opening said circuit when said assembly moves to its second position.

8. A refrigerator including a freezing compartment having an access opening, a closure member for closing said access opening, a shelf within said compartment, a freezing tray, means for pivotally supporting one end of said tray on said shelf for manual movement of said tray about an axis adjacent said one end between a freezing position and an inverted discharge position, a movable member carried by said shelf for supporting the other end of said tray when said tray is in its freezing position and to permit movement of said other end of said tray from a first position when said tray is empty to a second position when said tray is filled with water, a water supply line for supplying water to said tray when said tray is in its freezing position, an electrically operated valve in said line for controlling the flow of water to said tray, and an electrical valve-control circuit for operating said valve comprising in series connection, a first normally closed switch for opening said circuit upon movement of said tray to its second position and a second switch operated by said closure member for opening said circuit when said closure member is open.

References Cited in the file of this patent
UNITED STATES PATENTS 2,828,935    Ziegler _____ Apr. 1, 1958
2,891,385    Nelson _____ June 23, 1959